US008567783B2

(12) United States Patent
Cornell et al.

(10) Patent No.: US 8,567,783 B2
(45) Date of Patent: Oct. 29, 2013

(54) GAMING MACHINE WITH ZONE-BASED THERMAL MANAGEMENT SYSTEM

(75) Inventors: Bradley D. Cornell, LaGrange, IL (US);
Edward J. Redd, Chicago, IL (US);
Victor Mercado, Berwyn, IL (US);
Walter E. Smolucha, Melrose Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 320 days.

(21) Appl. No.: 13/176,639

(22) Filed: Jul. 5, 2011

(65) Prior Publication Data
US 2013/0012311 A1   Jan. 10, 2013

(51) Int. Cl.
*A63B 71/00* (2006.01)

(52) U.S. Cl.
USPC ........................................ 273/142 R

(58) Field of Classification Search
USPC ........................................ 273/142 R
See application file for complete search history.

(56) References Cited

U.S. PATENT DOCUMENTS

| 5,092,596 | A * | 3/1992 | Bucaria .................... 273/244.2 |
| 5,120,060 | A * | 6/1992 | Parker et al. ............... 273/138.2 |
| 5,588,650 | A * | 12/1996 | Eman et al. ................ 273/142 B |
| 5,611,730 | A * | 3/1997 | Weiss .............................. 463/20 |
| 5,761,647 | A * | 6/1998 | Boushy ........................ 705/7.29 |
| 6,491,298 | B1 | 12/2002 | Criss-Puszkiewicz et al. ....................... 273/148 R |
| 7,518,862 | B1 | 4/2009 | Macika et al. ................ 361/688 |
| 8,024,073 | B2 * | 9/2011 | Imes et al. .................... 700/276 |
| 8,080,819 | B2 * | 12/2011 | Mueller et al. .................. 257/13 |
| 8,082,065 | B2 * | 12/2011 | Imes et al. .................... 700/276 |
| 8,099,195 | B2 * | 1/2012 | Imes et al. .................... 700/278 |
| 8,108,076 | B2 * | 1/2012 | Imes et al. .................... 700/278 |
| 8,177,628 | B2 * | 5/2012 | Manning et al. ................ 463/21 |
| 8,277,314 | B2 * | 10/2012 | Wolf et al. ....................... 463/29 |
| 8,287,380 | B2 * | 10/2012 | Nguyen et al. .................. 463/42 |
| 8,333,652 | B2 * | 12/2012 | Nguyen et al. .................. 463/22 |
| 8,360,857 | B2 * | 1/2013 | Walker et al. .................... 463/25 |
| 8,373,362 | B2 * | 2/2013 | Chemel et al. ................ 315/297 |
| 8,398,365 | B2 * | 3/2013 | Hopkins ........................ 415/119 |

(Continued)

FOREIGN PATENT DOCUMENTS

WO    WO 2008/057400        5/2008    ............... G06F 1/20

OTHER PUBLICATIONS

Product Specification Sheet: Adda Corporation —AD7530 Series, 2008 (1 page).

(Continued)

*Primary Examiner* — Kurt Fernstrom
*Assistant Examiner* — Dolores Collins
(74) *Attorney, Agent, or Firm* — Nixon Peabody LLP

(57) ABSTRACT

A gaming terminal for playing a wagering game includes a gaming cabinet, a first surface, a video display assembly, and a first blower. The gaming cabinet includes an intake port and an exhaust port. The first surface is within the cabinet and divides the cabinet into an upper chamber and a lower chamber. The video display assembly includes a video display having a display area and a display housing. The video display assembly is positioned adjacent to the upper chamber of the game cabinet at an angle between about 0 degrees and about 45 degrees relative to horizontal. The display housing forms a longitudinal channel along a substantial portion of a back side opposite the display area. The first blower is disposed in the upper chamber. The longitudinal channel is at least partially sealed such that the first blower creates a negative pressure within the longitudinal channel.

45 Claims, 9 Drawing Sheets

(56) References Cited

U.S. PATENT DOCUMENTS

| | | | |
|---|---|---|---|
| 8,414,251 B2* | 4/2013 | Hopkins | 415/61 |
| 8,419,348 B2* | 4/2013 | Hopkins | 415/61 |
| 2009/0061987 A1 | 3/2009 | Canterbury et al. | 463/20 |
| 2010/0029391 A1 | 2/2010 | Greenberg et al. | 463/46 |
| 2010/0093445 A1 | 4/2010 | Mattice et al. | 463/46 |
| 2011/0111838 A1 | 5/2011 | Bauer et al. | 463/25 |
| 2011/0161968 A1* | 6/2011 | Bash et al. | 718/102 |
| 2012/0064923 A1* | 3/2012 | Imes et al. | 455/457 |
| 2012/0135759 A1* | 5/2012 | Imes et al. | 455/457 |
| 2012/0252430 A1* | 10/2012 | Imes et al. | 455/418 |
| 2013/0066473 A1* | 3/2013 | Smith et al. | 700/277 |

OTHER PUBLICATIONS

Product Specification Sheet: Cooltron —FBD7530B12W9 [online]. [Retrieved on Feb. 21, 2011]. Retrieved from the Internet: <URL: http://www.cooltron.com/English/productshow.asp?id=317> (2 pages).

* cited by examiner

US 8,567,783 B2

GAMING MACHINE WITH ZONE-BASED THERMAL MANAGEMENT SYSTEM

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering game machines and, more particularly, to thermal management systems for wagering game machines.

BACKGROUND OF THE INVENTION

Gaming machines or terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing terminals and the expectation of winning each terminal is roughly the same (or believed to be the same), players are most likely to be attracted to the more entertaining and exciting terminal. As a result, wagering game machine operators strive to employ the most entertaining and exciting machines available, because such machines attract frequent play and provide increased profitability for the operators. Consequently, wagering game machines have added increasingly advanced and sophisticated features over the years in terms of their operational and display capabilities.

For example, modern gaming machines typically include one or more power supplies, video displays, communication or mother boards, currency acceptors, payoff mechanisms, card readers, sound systems, ticket printers and central processing units (CPUs). During extensive use, and due to the fact that many gaming terminals are always "on" even when not being played, the various components of the gaming machine generate significant amounts of heat such that some type of thermal management system is usually required to maintain the components within specified operating temperatures.

One prior approach to thermal management involves the use of fans to direct air onto the components of the gaming machine. Other prior approaches use expensive and complicated water cooling systems. As the sophistication of gaming machines increases (e.g., greater processing power, display, and audio requirements), more efficient, effective, and less costly thermal management systems are required.

SUMMARY OF THE INVENTION

A gaming terminal for playing a wagering game includes a gaming cabinet, a first surface, and a first blower. The gaming cabinet includes a first intake port and a first exhaust port. The first surface is within the cabinet and divides the cabinet into a first chamber and a second chamber. Each of the chambers encloses at least one respective electronic component used in conjunction with the wagering game. The first blower is disposed in the first chamber and is adjacent to the first exhaust port in the cabinet. The first chamber is at least partially sealed. Operation of the first blower causes ambient air to be drawn into the first chamber via the first intake port and to be directed towards the first exhaust port such that an air pressure at the first exhaust port is lower than an air pressure at the first intake port, which creates a negative pressure within the first chamber.

A gaming terminal for playing a wagering game includes a gaming cabinet, a first surface, a video display, and a first blower. The gaming cabinet includes an intake port and an exhaust port. The first surface is within the cabinet and divides the cabinet into an upper chamber and a lower chamber. The lower chamber encloses at least one electronic component used in conjunction with the wagering game. The video display is coupled to the upper chamber of the game cabinet. The video display is disposed at an angle such that a display area of the video display is positioned between about 0 degrees and about 45 degrees relative to horizontal. The first blower is disposed in the upper chamber and is adjacent to the exhaust port in the cabinet. The upper chamber is at least partially sealed such that within the upper chamber the first blower creates a negative pressure in which an air pressure at the exhaust port is lower than an air pressure at the intake port.

A gaming terminal for playing a wagering game includes a gaming cabinet, a first surface, a video display assembly, and a first blower. The gaming cabinet includes an intake port and an exhaust port. The first surface is within the cabinet and divides the cabinet into an upper chamber and a lower chamber. The lower chamber encloses at least one electronic component used in conjunction with the wagering game. The video display assembly includes a video display having a display area and a display housing. The video display assembly is positioned adjacent to the upper chamber of the game cabinet at an angle between about 0 degrees and about 45 degrees relative to horizontal. The display housing forms a longitudinal channel along a substantial portion of a back side opposite the display area and between a dedicated display intake port adjacent to the intake port of the cabinet and a dedicated display exhaust port adjacent to the exhaust port of the cabinet. The first blower is disposed in the upper chamber and is adjacent to the dedicated display exhaust port and the first exhaust port in the cabinet. The longitudinal channel is at least partially sealed such that the first blower creates a negative pressure within the longitudinal channel.

A video display assembly for displaying at least a portion of a wagering game includes a video display, a display housing, and a first blower. The video display is configured to display a randomly selected outcome of the wagering game. The video display is disposed at an angle such that a display area of the video display viewable by a player of the wagering game is positioned between about 0 degrees and about 45 degrees relative to horizontal. The display housing is coupled to the video display, the display housing forms an air conduit along a substantial portion of a back side of the video display opposite the display area. The air conduit lies between a dedicated intake port and a first dedicated exhaust port of the display housing. The first blower is coupled to the display housing adjacent to the first dedicated exhaust port. The air conduit is at least partially sealed such that the first blower creates a negative pressure within the air conduit.

A gaming terminal for playing a wagering game includes a gaming cabinet, a first surface, a first blower, and a second blower. The gaming cabinet includes first and second intake ports and first and second exhaust ports. The first surface is within the cabinet and divides the cabinet into an upper chamber and a lower chamber. Each of the chambers encloses at least one respective heat-generating electronic component each used in conjunction with the wagering game. The first blower is disposed in the upper chamber and is adjacent to the first exhaust port in the cabinet. The upper chamber is at least partially sealed such that the first blower is configured to draw ambient air into the upper chamber from the first intake port and direct the air towards the first exhaust port. The second blower is disposed in the lower chamber and is adjacent to the second exhaust port in the cabinet. The lower chamber is at least partially sealed such that the second blower is configured to draw ambient air into the lower chamber from the second intake port and direct the air towards the second exhaust port. In response to the second blower being inactive, the temperature of the air flowing through the upper chamber increases no more than ten degrees Celsius.

Additional aspects of the invention will be apparent to those of ordinary skill in the art in view of the detailed description of various embodiments, which is made with reference to the drawings, a brief description of which is provided below.

Figure 1:
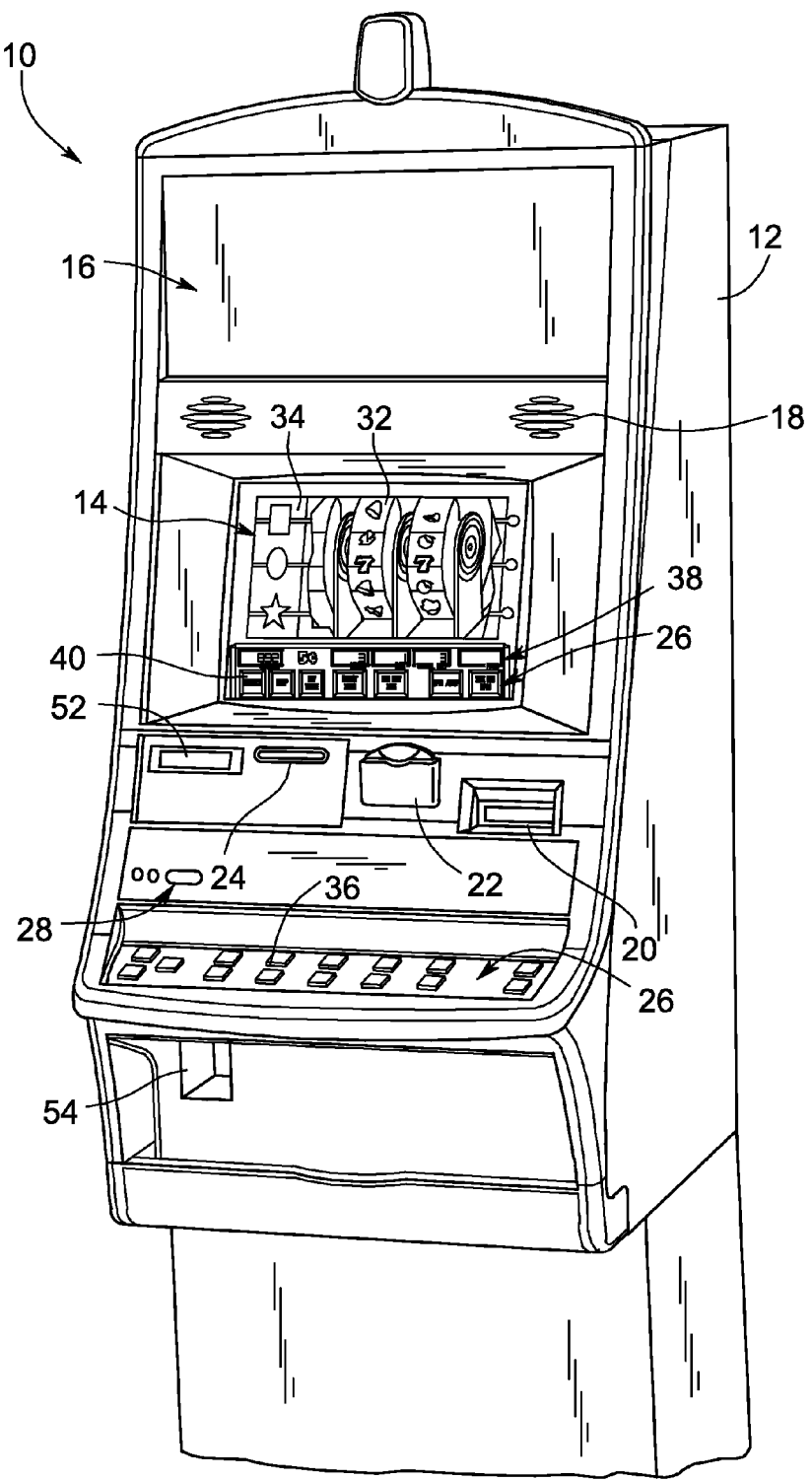
FIG. 1 is a perspective view of a free-standing gaming terminal according to an embodiment of the present disclosure.

While the disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION

While this disclosure is susceptible of embodiment in many different forms, there is shown in the drawings and will herein be described in detail preferred embodiments of the disclosure with the understanding that the present disclosure is to be considered as an exemplification of the principles of the disclosure and is not intended to limit the broad aspect of the disclosure to the embodiments illustrated.

Referring to FIG. 1, there is shown a gaming terminal 10 similar to those used in gaming establishments, such as casinos. With regard to the present disclosure, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
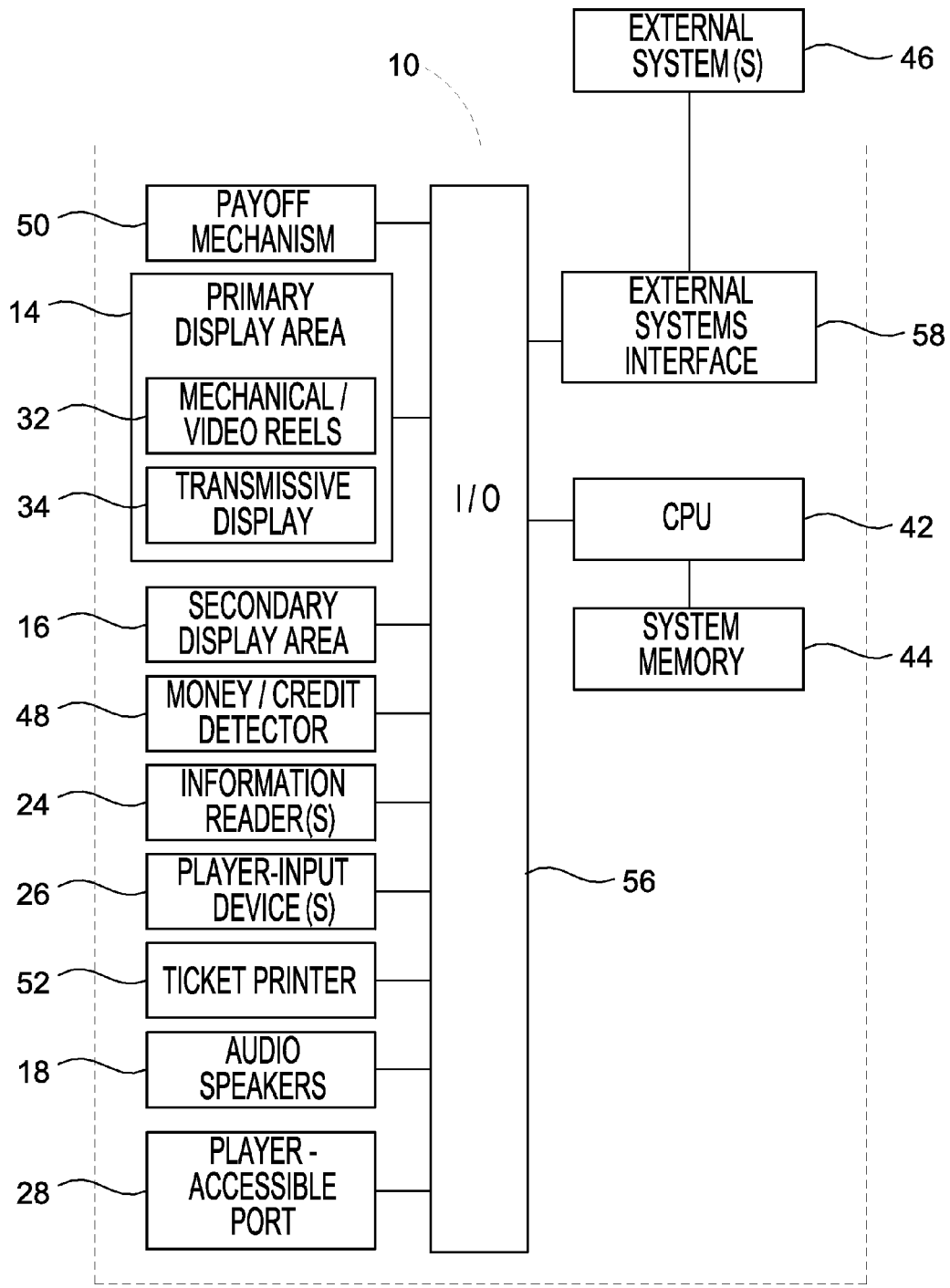
FIG. 2 is a schematic view of a gaming system according to an embodiment of the present disclosure.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
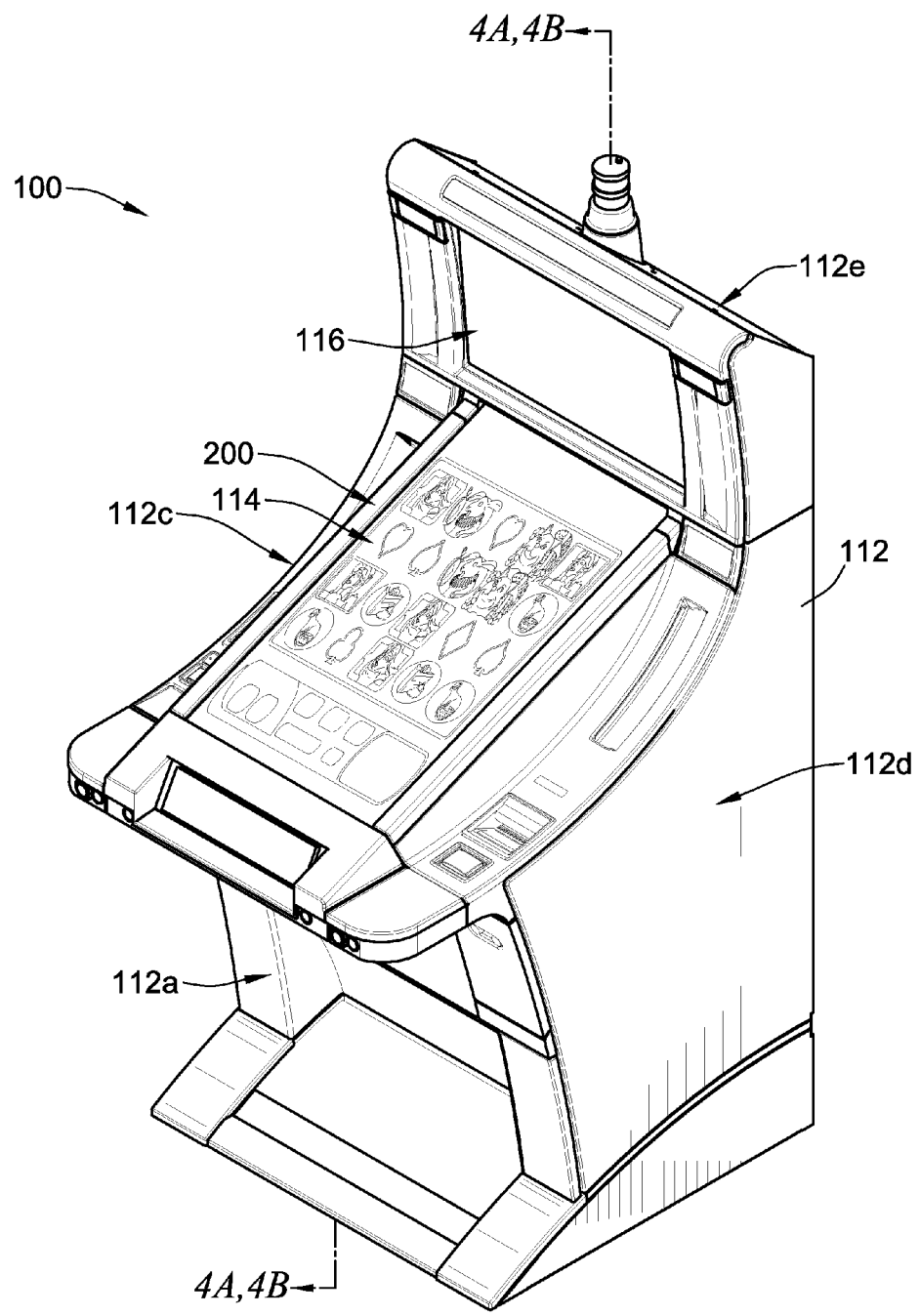
FIG. 3 is a perspective view of a free-standing gaming terminal according to an embodiment of the present disclosure.

Referring now to FIG. 3, a gaming terminal or machine 100 includes a gaming cabinet or housing 112, a primary display area 114, and a secondary display area 116, which are similar to the cabinet 12, the primary display area 14, and the secondary display area 16, respectively, discussed above in reference to FIGS. 1 and 2. The gaming terminal 100 further includes a video display assembly 200 used for displaying a wagering game. The gaming terminal 100 is shown in its closed position, where a portion of the gaming cabinet 112 including the video display assembly 200 is closed in its operating configuration. The gaming terminal 100 is shown in its open position in FIG. 5, which provides access to internal components of the gaming terminal 100. The gaming cabinet 112 can have a variety of external shapes and sizes to contain the necessary electronic components used in conducting a wagering game but the gaming cabinet 112 generally includes a front wall or surface 112a (FIG. 3), an opposing back wall or surface 112b (FIG. 6), two opposing side walls or surfaces 112c,d (FIGS. 3 and 6), a lid 112e (FIG. 3), and a base 112f (FIG. 6).

Figure 4A:
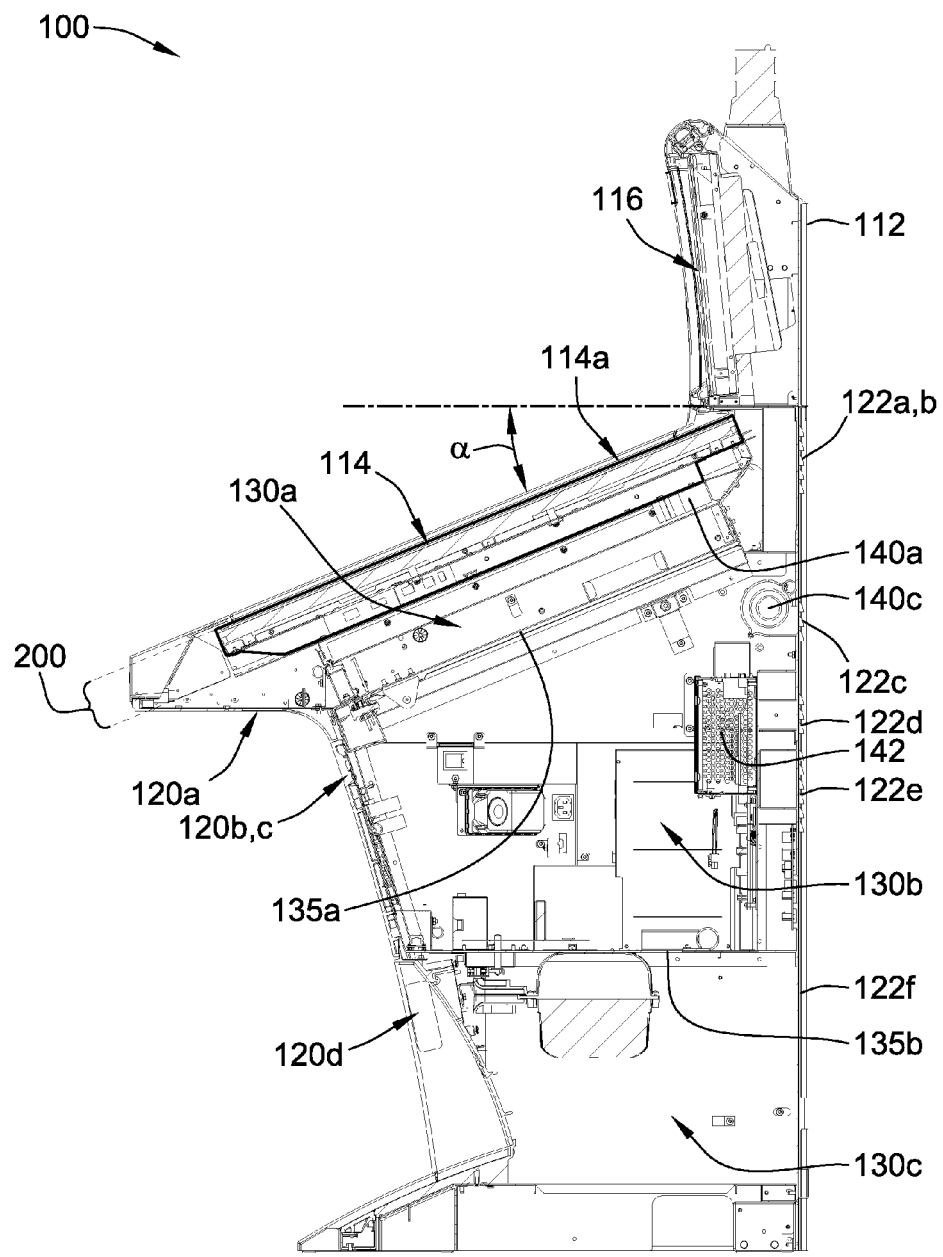
FIG. 4A is a side cross-sectional view of the free-standing gaming terminal of FIG. 3.
Figure 6:
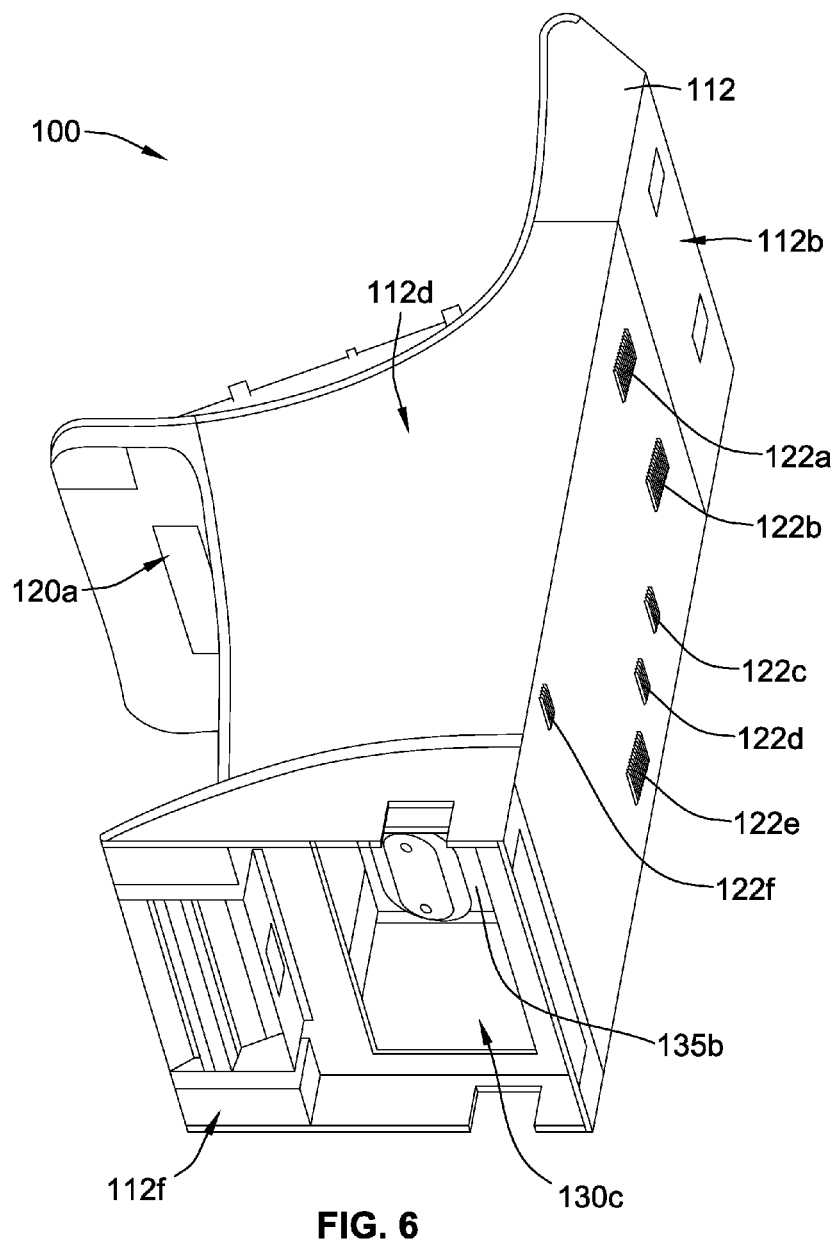
FIG. 6 is a perspective view of the back and bottom sides the free-standing gaming terminal of FIG. 3.

Referring generally to FIGS. 3 and 4A, the gaming cabinet 112 includes a plurality of intake ports or apertures 120a-d and a plurality of exhaust ports or apertures 122a-f (best shown in FIG. 6). The intake ports 120 and the exhaust ports 122a-f include deliberate apertures or openings in a front and rear, respectively, of the gaming cabinet 112 of the gaming machine 100. The deliberate apertures of the intake ports 120a-d are dedicated to allowing ambient air to enter the cabinet 112 as opposed to a mere crack or relatively minor aperture used for attaching two portions of the cabinet 112, such as, for example, an aperture designed to receive a fastening means like a screw or bolt, etc. Similarly, the deliberate apertures of the exhaust ports 122a-f are dedicated to allowing heated air within the gaming cabinet 112 to exit or exhaust as opposed to exiting through a mere crack or relatively minor aperture.

The exhausted heated air exiting the exhaust ports 122a-f (FIG. 6) includes the ambient temperature air drawn in through the intake ports 120a-d (FIG. 4A) that is heated inside of the gaming cabinet 112 by one or more electronic components contained therein used in operating the gaming terminal's wagering game(s). Each of the exhaust ports 122a-f (FIG. 6) is configured to exhaust heated air entering a corresponding one or more of the intake ports 120a-d (FIG. 4A). For example, the exhaust ports 122a,b (FIG. 6) are configured to exhaust heated air drawn in through the first intake port 120a (best shown in FIG. 5).

The deliberate apertures of the intake ports 120a-d (FIG. 4A) and of the exhaust ports 122a-f (FIG. 6) can be of various different shapes and sizes. For example, the shape of the deliberate apertures of the intake and exhaust ports 120a-d, 122a-f can be square, rectangular, circular, polygonal, triangular, some random shape, or a combination thereof. The area of the deliberate apertures of the intake ports 120a-d is selected and designed such that a sufficient amount of ambient air is allowed to enter into the gaming cabinet 112 to maintain desirable operating temperatures therein. Similarly, the area of the deliberate apertures of the exhaust ports 122a-f is selected and designed such that a sufficient amount of heated air within the gaming cabinet 112 is allowed to exit or exhaust out of the gaming cabinet 112 to maintain the desirable operating temperatures therein.

For example, the size of each of the deliberate apertures of the intake and exhaust ports 120a-d, 122a-f can be between about one square inch and about twenty-five square inches. For another example, the size of each of the deliberate apertures of the intake and exhaust ports 120a-d, 122a-f can be between about five square inches and about fifteen square inches. For yet another example, the size of each of the deliberate apertures of the intake and exhaust ports 120a-d, 122a-f can be about ten square inches. Various other sizes of the deliberate apertures are contemplated.

Figure 7A:
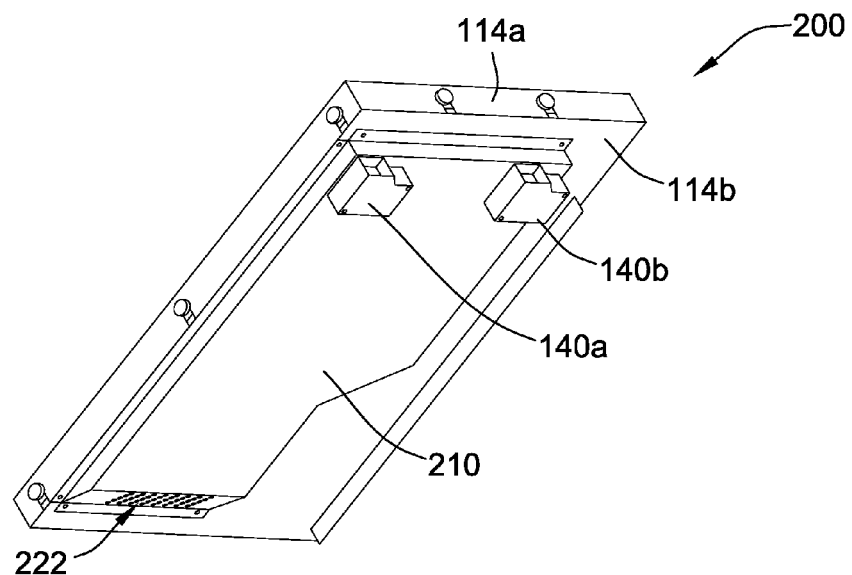
FIG. 7A is a perspective view of a video display assembly of the free-standing gaming terminal of FIG. 3.
Figure 7B:
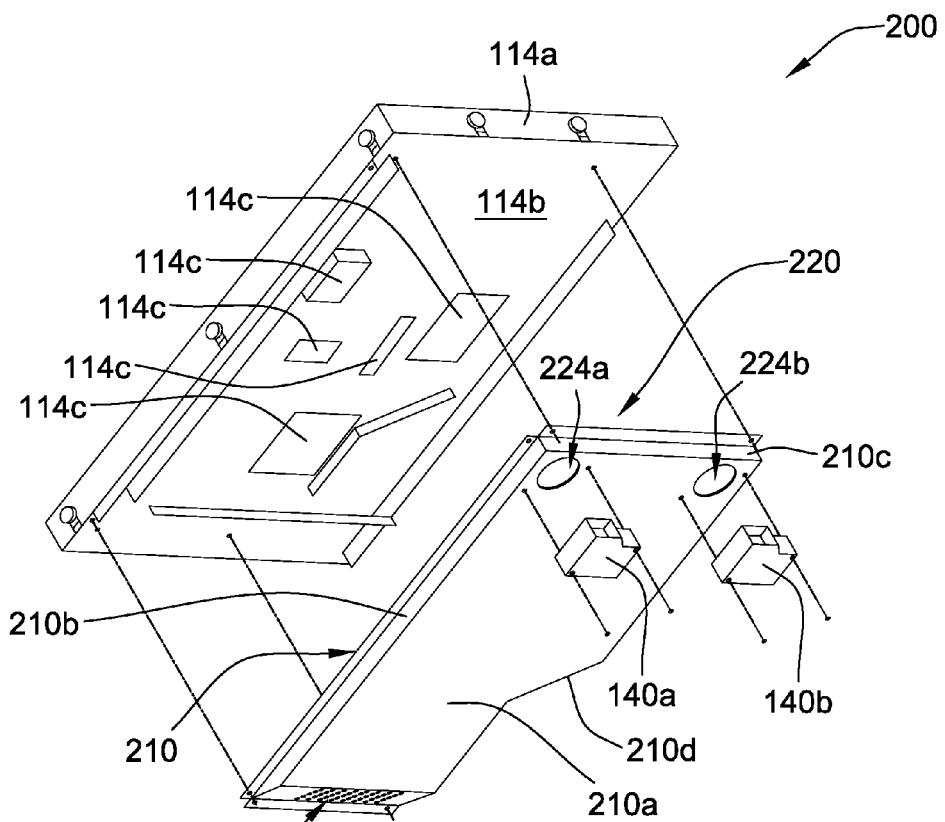
FIGS. 7B and 7C are different exploded perspective views of the video display assembly of FIG. 7A.
Figure 7C:
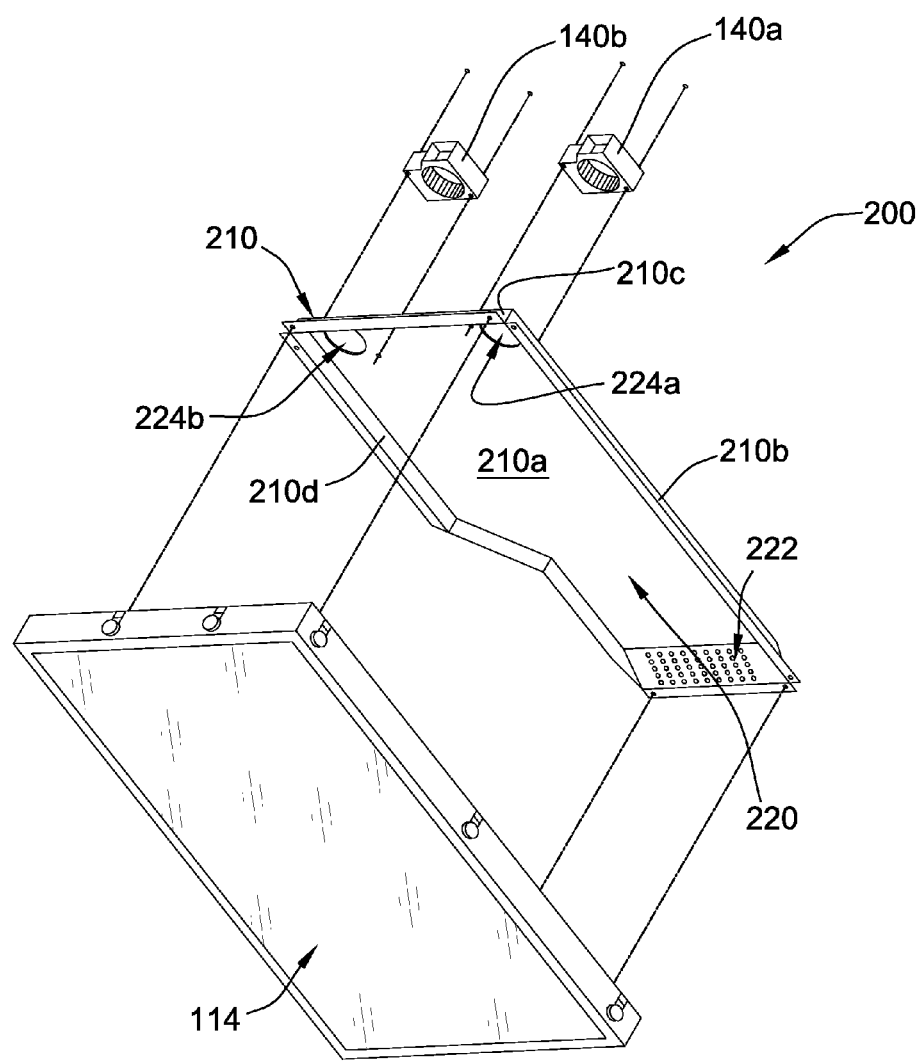

Each of the intake and exhaust ports 120a-d, 122a-f can further include an obstruction configured to impede and/or prevent undesirable access into the cabinet 112. While the obstructions partially block the flow of ambient air through the intake ports 120a-d and the flow of heated air through the exhaust ports 122a-f, the obstructions are necessary to prevent undesirable intrusions into the gaming cabinet 112 that might alter the gaming terminal internal electronic components (i.e., CPU 142). The obstructions of the intake and exhaust ports 120a-d, 122a-f can include, for example, one or more grills, one or more gates or grates, one or more louvers, or any structure configured to allow sufficient air flow therethrough but provide the necessary security. One non-limiting example of an obstruction is shown in FIGS. 7A-C included in a dedicated display intake port 222, which is described below.

Each of the intake ports 120a-d and each of the exhaust ports 122a-f is located in one of the chambers 130a-c. Specifically, as best shown in FIG. 4A, the first intake port 120a is located in the upper chamber 130a, the second and third intake ports 120b,c are located in the middle chamber 130b, and the fourth intake port 120d is located in the lower chamber 130c. Similarly, as best shown in FIG. 6, the first and second exhaust ports 122a,b are located in the upper chamber 130a, the third, fourth, and fifth exhaust ports 122c-e are located in the middle chamber 130b, and the sixth exhaust port 122f is located in the lower chamber 130c. By a port being located in a chamber, it is meant that the intake and exhaust ports provide direct access to or from the respective chamber. For example, the first intake port 120a provides direct access to the upper chamber 130a for ambient air to enter the upper chamber 130a. Similarly, the sixth exhaust port 122f provides direct access from the lower chamber such that heated air can exit directly through the sixth exhaust port 122f from the lower chamber 130c to a surrounding environment of the gaming terminal 100.

The exhaust ports 122 are generally horizontally offset from a vertical centerline along a height of the gaming cabinet 112 as best shown in FIG. 6. The horizontal offset of the exhaust ports 122 aids in preventing the heated air exiting the exhaust ports 122 from being directed towards correspondingly offset exhaust ports in a second gaming terminal (not shown) positioned in a back-to-back relationship with the gaming terminal 100.

The internal space within the gaming cabinet 112 of the gaming terminal 100 is divided into at least three distinct chambers or areas 130a-c as best shown in FIG. 4A. The chambers 130a-c are separated or delineated by at least one internal wall or surface. First and second surfaces 135a,b within the gaming cabinet 112 divide the gaming cabinet 112 into an upper chamber 130a, a middle chamber 130b, and a lower chamber 130c. The first surface 135a is positioned between the upper and middle chambers 130a,b and the second surface 135b is positioned between the middle and lower chambers 130b,c (best shown in FIGS. 4A and 5). The surfaces 135a,b act as thermal barriers between the chambers 130a-c that aid in preventing air heated within one chamber from (1) entering into an adjacent chamber and/or (2) significantly affecting an operating temperature of an adjacent chamber(s).

For example, the first surface 135a aids in preventing air heated within the middle chamber 130b from entering into the upper chamber 130a. Similarly, the second surface 135b aids in preventing air heated within the lower chamber 130c from entering into the middle chamber 130b. By significantly affecting an operating temperature, it is meant that the surfaces 135a,b aid in preventing the air temperature in one chamber from causing an air temperature in an adjacent chamber from rising above a predetermined threshold for that particular chamber. The surfaces 135a,b can be made from or more sheets or pieces of material, such as, for example, plastic, metal, or a combination thereof. The surfaces 135a,b can have multiple layers with or without air gaps therebetween to aid in providing a thermal barrier between the chambers 130a-c.

The first and second surfaces 135a,b can be horizontal, at an angle with respect to horizontal, or a combination thereof. As shown, a major portion of the first surface 135a is generally at an angle α with respect to horizontal (i.e., when the gaming terminal is in the closed position as in FIG. 4A) and the second surface 135b is generally horizontal. By major portion, it is meant that the first surface 135a is generally flat or planar, but can include one or more protrusions, divots, cuts, apertures, bent or curved portions, flanges, etc.

The first surface 135a defines the upper chamber 130a, which includes the video display assembly 200, which is best shown in FIGS. 7A-C. The video display assembly 200 includes a video display 114a having the primary display area 114 and a display housing 210. The video display assembly 200 is positioned within the upper chamber 130a of the gaming cabinet 112 at an angle α relative to horizontal such that the primary display area 114 forms an upper most surface defining the upper chamber 130a. That is, the upper chamber 130a is generally between the primary display area 114 and the first surface 135a.

Figure 5:
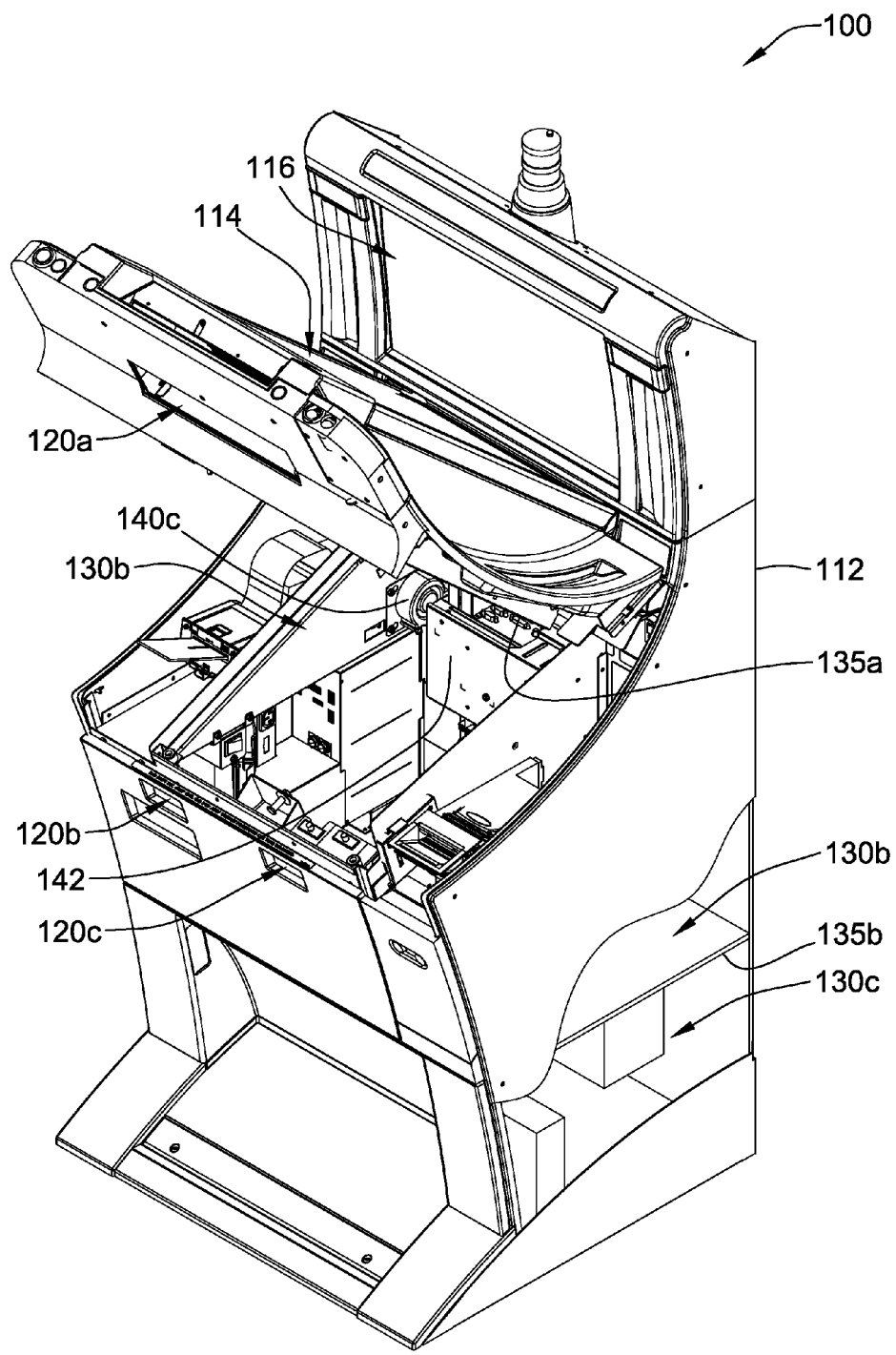
FIG. 5 is a perspective view of the free-standing gaming terminal of FIG. 3 in an open position having a portion of a side removed.

The video display assembly 200 is attached to the gaming cabinet 112 via one or more hinges (not shown) such that the upper chamber 130a can be rotated upwardly to provide access to the middle chamber 130b as shown in FIG. 5. When the upper chamber 130a is rotated back down to convert the gaming cabinet from the open position (FIG. 5) to the closed position (FIG. 4A), the first surface 135a aids in at least partially sealing the middle chamber 130b from the upper chamber 130a.

As shown in FIG. 4A, the video display assembly 200 is positioned within the gaming cabinet 112 at the angle α to aid a player of the gaming terminal 100 in viewing wagering game graphics displayed on the primary display area 114. The video display assembly 200 and/or the primary display area 114 can be positioned at an angle α between about 0 degrees (i.e., about horizontal) and about 45 degrees. As shown, the video display assembly 200 and/or the primary display area 114 are positioned at an angle α of about 22.5 degrees. Various alternative angles for α are contemplated such as, for example, between about 15 degrees and about 30 degrees. The secondary display area 116 is positioned within the gaming cabinet at an angle between about 75 degrees and about 125 degrees relative to the horizontal. Alternatively, the secondary display area 116 is positioned within the gaming cabinet at an angle of about 90 degrees relative to horizontal or at an angle of about 0 degrees relative to vertical.

The video display 114a is on most of the time (e.g., on 99 percent or more) as the gaming terminal 100 is on most of the time to allow players to play the wagering games displayed by the gaming terminal 100 (gaming terminals that are off do not make money for owners, e.g., casinos). Even when a player is not playing the wagering game(s) of the gaming terminal 100, the video display 114a is on displaying one or more attraction sequences to entice players to play the wagering game(s). Thus, the video display 114a is generally constantly on and generating heat that must be exhausted to prolong the life of the video display and/or protect the video display 114a from damage and degradation over time that requires maintenance and a loss of revenue during the maintenance, which is undesirable to the owner of the gaming terminals.

Further, the heat generated by the video display 114a remains partially trapped under the video display 114a due to the angle α of the video display 114a as heat rises vertically. As most video displays are designed to be operated at an angle of about 90 degrees to horizontal (plus or minus a few degrees), heat generated by the video display can radiate away from the back side of the display. However, when the video display is operated at an angle α between 0 and 45 degrees relative to horizontal like the video display 114a (FIG. 4A), the heat generated is not sufficiently dissipated through radiation.

As best shown in FIG. 7C, the display housing 210 forms a longitudinal channel or air conduit 220 along a substantial portion of a back side 114b (FIG. 7B) of the video display 114a opposite the primary display area 114 (FIG. 7C). The channel 220 (FIG. 7C) assists in exhausting heat generated by the video display 114a. The channel 220 extends between a dedicated display intake port 222, which is adjacent to the first intake port 120a (FIG. 5) of the gaming cabinet 112, and first and second dedicated display exhaust ports 224a,b (FIG. 7C), which are adjacent to the first and second exhaust ports 122a,b (FIG. 6), respectively, of the gaming cabinet 112. By substantial portion of the back side 114b of the video display 114a it is meant that the channel 220 covers at least 50 percent of the back side 114b. The channel 220 can alternatively cover between about 60 percent and about 90 percent of the back side 114b. Other coverages are contemplated, such as, for example, less than 50 percent, more than 90 percent, etc.

Some video displays have a hot spot or area where heat generated by internal components (e.g., transistors, circuit boards, power supplies, etc.) is concentrated. The hot spot is typically in a geometric center of the video display, however, the hot spot can vary among video displays provided by different manufacturers. The substantial portion of the back side 114b that is covered by the channel 220 can include such a hot spot, which aids in cooling the video display 114a efficiently.

As shown in FIG. 7C, the portion of the display housing 210 that forms the channel 220 includes a base 210a opposite the back side 114b of the video display 114a and three side walls 210b-d. The display housing 210 that forms the channel 220 extends from the back side 114b of the video display 114a into the upper chamber 130a. The channel 220 has a depth that is defined by a height of the side walls 210b-d. The channel 220 has a transverse width that is the same as or smaller than a transverse width of the video display 114a. The width of the channel 220 can be between about 50 percent and 100 percent of the width of the video display 114a. Similarly, the channel 220 has a longitudinal length that is the same as or smaller than a longitudinal length of the video display 114a. The length of the channel 220 can be between about 50 percent and 100 percent of the length of the video display 114a. The width and the length of the channel 220 can be at least about 90 percent of the width and length of the video display 114a, respectively. While the width of the channel 220 is shown as increasing along a portion of the longitudinal length of the channel 220, the width can be constant between dedicated display intake port 222 and the dedicated display exhaust ports 224a,b.

The video display assembly 200 includes many heat generating components that contribute to the total heat generation of the video display assembly 200. For example, the video display 144a of the assembly 200 includes many internal transistors (not shown) and internal circuit driving boards (not shown) that generate significant amounts of heat. This heat generated by the internal components of the video display 114a is radiated from the back side 114b of the video display 114a and is captured within the channel 220. That is, the back side 114b of the video display 114a acts as a heat sink to draw the heat out of the video display 114a and transfers the heat into the channel 220. In addition to the heat being generated by the internal components of the video display 114a, one or more additional components 114c (e.g., video driver circuit boards) can be mounted onto the back side 114b of the video display 114a. The heat generated by the internal components and the one or more additional components is exhausted from the channel 220 to maintain a desirable operation temperature for the video display 114a and its surroundings (i.e., the upper chamber 130a) as described below.

Each of the chambers 130a-c (shown in FIG. 4A) includes at least one electronic component used in conjunction with playing the wagering game displayed on the primary and/or secondary display areas 114, 116. For example, the upper chamber 130a can include the video display 114a. For another example, the middle chamber 130b can include a central processing unit (CPU) 142 and the lower chamber 130c can include a subwoofer (not shown). Various other types of electronic components can be included in each of the chambers 130a-c, such as, for example, an audio amplifier, one or more power supplies, a lighting controller, a USB hub, a media controller, a bank controller, a chair amplifier, etc. While the gaming terminal 100 is operating, which is generally all the time except for an occasionally required maintenance, each electronic component (e.g., video display 114a, CPU 142, etc.) within the gaming cabinet 112 continually generates heat.

In order to efficiently and effectively manage an internal air temperature within each of the chambers 130a-c due to the heat generated by the electronic components used to operate the gaming terminal 100, one or more blowers 140a-c are disposed in each of the chambers 130a-c. For example, first and second blowers 140a,b are disposed in the upper chamber 130a adjacent to the dedicated display exhaust ports 224a,b, respectively. As best shown in FIGS. 7A-C, the blowers 140a,b are coupled to the display housing 210 such that an intake of the blowers 140a,b is configured to receive heated air from within the channel 220. The channel 220 is at least partially sealed such that operation of the blowers 140a,b creates a negative pressure within the channel 220. By at least partially sealed, it is meant that the channel 220 can include holes and/or gaps due to, for example, screw holes, wire holes, etc., but nonetheless remains sealed such that a negative pressure can be maintained therein. By negative pressure, it is meant that the pressure within the channel 220 is lower than the pressure outside of the channel 220, such as, for example, the pressure in the upper chamber 130a and/or the pressure outside of the gaming cabinet 112. This negative pressure and/or relatively lower pressure causes cooler ambient temperature air to flow from outside of the gaming cabinet 112 and into the channel 220, which is useful for maintaining the video display 114a at a desirable operating temperature as described herein.

Operation of the blowers 140a,b and the negative pressure causes ambient air outside of the gaming terminal 100 to be drawn into the dedicated display intake port 222 in a first direction that is generally parallel with the longitudinal direction of the channel 220. The ambient air enters the gaming cabinet 112 from the first intake port 120a and flows through the channel 220 adjacent to the back side 114b of the video display 114a opposite the primary display area 114 in the first direction. This flow of ambient air into the channel 220 cools the video display 114a. The ambient air flows into the channel 220 at least in part due to the air pressure at the dedicated display exhaust ports 224a,b being lower than an air pressure at the dedicated display intake port 222. The lower pressure at the dedicated display exhaust ports 224a,b cause the air to flow from the higher pressure at the dedicated display intake port 222 towards the dedicated display exhaust ports 224a,b. Air is drawn out of the channel 220 by the blowers 140a,b in a second direction that is orthogonal to the first direction. The blowers 140a,b direct the withdrawn air in a third direction that is generally parallel to the first direction towards the first and second exhaust ports 122a,b.

For another example, as shown in FIG. 4A, a blower 140c is disposed in the middle chamber 130b adjacent to the exhaust port 122c. The middle chamber 130b is at least partially sealed with respect to the upper and lower chambers 130a,c and the outside ambient air surrounding the gaming terminal 100 such that operation of the blower 140c creates a negative pressure within the middle chamber 130b. Additionally, operation of the blower 140c causes ambient air to be drawn into the middle chamber via the second and third intake ports 120b,c and to be directed towards the exhaust ports 122c-e such that an air pressure at the exhaust ports 122c-e is lower than an air pressure at the intake ports 120b,c.

Similarly, a lower-chamber blower (not shown) can be disposed in the lower chamber 130c (FIG. 4A) adjacent to the exhaust port 122f. The lower chamber 130c is at least partially sealed with respect to the middle chamber 130b and the outside ambient air surrounding the gaming terminal 100 such that operation of the lower-chamber blower (not shown) creates a negative pressure within the lower chamber 130c. Additionally, operation of the lower-chamber blower (not shown) causes ambient air to be drawn into the lower chamber via the fourth intake port 120d and to be directed towards the exhaust port 122f such that an air pressure at the exhaust port 122f is lower than an air pressure at the intake port 120d.

The flow of ambient air into the chambers 130a-c aids in maintaining acceptable operating temperatures inside of each of the chambers 130a-c irrespective of the operating temperature within the other adjacent chamber(s). For example, the flow of ambient air into the upper chamber 130a aids in maintaining an acceptable operating temperature inside of the upper chamber 130a irrespective of the operating temperature within the middle and lower chambers 130b,c. It is contemplated that in response to the blowers (e.g., blower 140c) in the middle and/or lower chambers 130b,c being turned off or failing (i.e., are not operating properly or at all), air within the upper chamber 130a is maintained at an acceptable operating temperature when the first and/or second blowers 140a,b are operating. By acceptable operating temperature within the upper chamber 130a, it is meant that the temperature of the air within the upper chamber 130a is between 40 degrees Celsius and 60 degrees Celsius. It is contemplated that in response to one or more of the blowers 140 in the middle and/or lower chambers 130b,c failing to operate properly or at all, the operating temperature within the upper chamber 130a increases by no more than 10 degrees Celsius. It is contemplated that according to other embodiments, in response to one or more of the blowers 140 in the middle and/or lower chambers 130b,c failing to operate properly or at all, the operating temperature within the upper chamber 130a increases by no more than 5 degrees Celsius. It is contemplated that according to other embodiments, in response to one or more of the blowers 140 in the middle and/or lower chambers 130b,c failing to operate properly or at all, the operating temperature within the upper chamber 130a increases by no more than 3 degrees Celsius. It is further contemplated that according to yet other embodiments, in response to one or more of the blowers 140 in the middle and/or lower chambers 130b,c failing to operate properly or at all, the operating temperature within the upper chamber 130a increases by no more than 1 degree Celsius.

Similarly, the flow of ambient air into the middle chamber 130b aids in maintaining an acceptable operating temperature inside of the middle chamber 130b irrespective of the operating temperature within the upper and lower chambers 130a, c. In response to the blowers (e.g., blower 140a,b) in the upper and/or lower chambers 130a,c being turned off or failing (i.e., are not operating properly or at all), air within the middle chamber 130b is maintained at an acceptable operating temperature when the third blower 140c within the middle chamber 130b is operating. By acceptable operating temperature within the middle chamber 130b, it is meant that the temperature of the air within the middle chamber 130b is between 40 degrees Celsius and 90 degrees Celsius. In response to one or more of the blowers 140 in the upper and/or lower chambers 130a,c failing to operate properly or at all, the operating temperature within the middle chamber 130b increases by no more than 10 degrees Celsius. According to other embodiments, in response to one or more of the blowers 140 in the upper and/or lower chambers 130a,c failing to operate properly or at all, the operating temperature within the middle chamber 130b increases by no more than 5 degrees Celsius. According to other embodiments, in response to one or more of the blowers 140 in the upper and/or lower chambers 130a,c failing to operate properly or at all, the operating temperature within the middle chamber 130b increases by no more than 3 degrees Celsius. According to yet other embodiments, in response to one or more of the blowers 140 in the upper and/or lower chambers 130a,c failing to operate properly or at all, the operating temperature within the middle chamber 130b increases by no more than 1 degree Celsius.

Figure 4B:
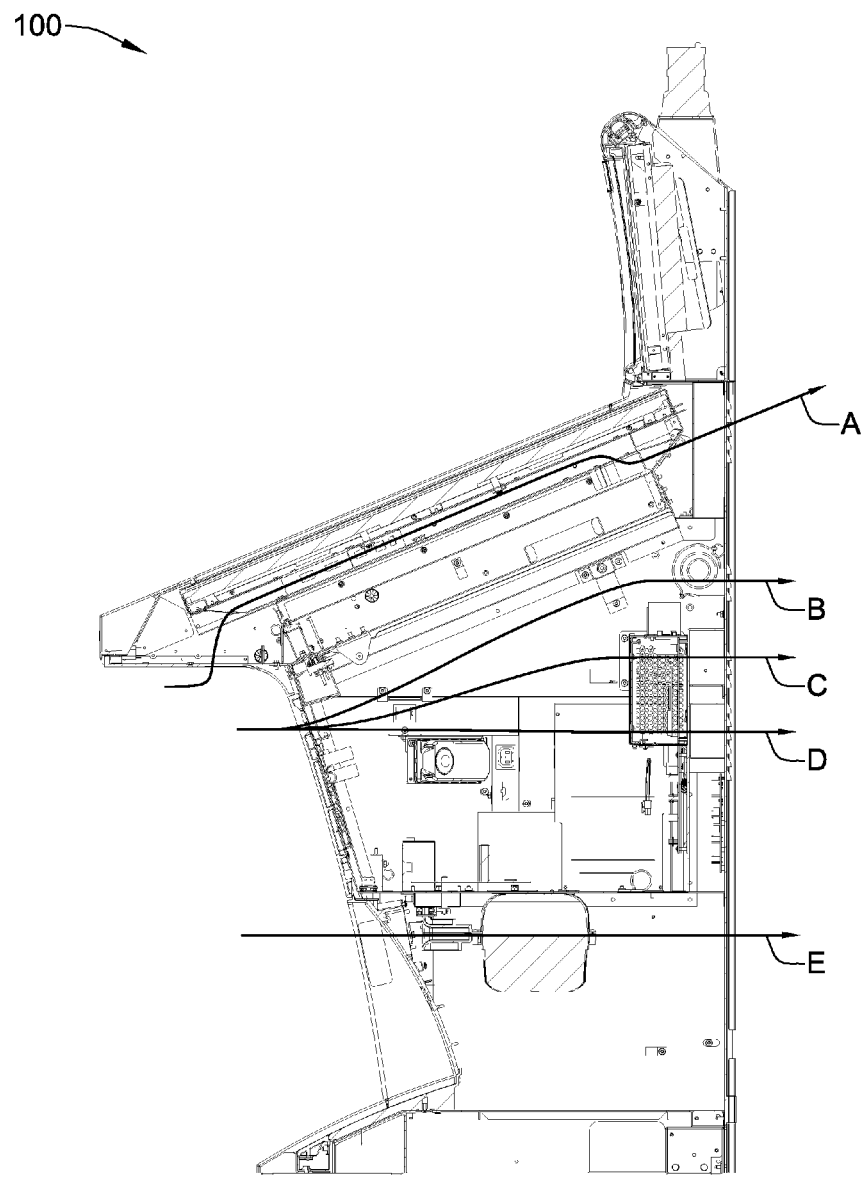
FIG. 4B is the side cross-sectional view of the free-standing gaming terminal of FIG. 4A illustrating various air flow paths.

The general flow of air through the chambers 130a-c is best shown in FIG. 4B. Specifically, the general flow of air through the upper chamber 130a is shown as arrow A, the general flow of air through the middle chamber 130b is shown as arrows B-D, and the general flow of air through the lower chamber 130c is shown as arrow E.

Referring to arrow A and the flow of air through the upper chamber 130a, operation of the blowers 140a,b within the upper chamber 130a causes ambient air outside of the gaming terminal 100 to be drawn into the upper chamber 130a through the first intake port 120a, then into the channel 220 through the dedicated display intake port 222 in a first direction, along the back side 114b of the video display 114a in the first direction, through the dedicated display exhaust ports 224a,b in a second direction generally orthogonal to the first direction, through the blowers 140a,b, and towards the first and second exhaust ports 122a,b in the first direction.

Referring to arrows B-D and the flow of air through the middle chamber 130b, operation of the blower 140c within the middle chamber 130b causes ambient air outside of the gaming terminal 100 to be drawn into the middle chamber 130b through the second and third intake ports 120b,c, then past the CPU 142 and/or other electronic components located within the middle chamber 130b, through the blower 140c, and out of the third exhaust port 122c. It is contemplated that one or more additional blowers (not shown) can be positioned within the middle chamber 130b and adjacent to the fourth and fifth exhaust ports 122d,e to cause air to flow out of the fourth and fifth exhaust ports 122d,e in the general directions of arrows C and D, respectively.

Referring to arrow E and the flow of air through the lower chamber 130c, operation of the blower (not shown) within the lower chamber 130c causes ambient air outside of the gaming terminal 100 to be drawn into the lower chamber 130c through the fourth intake port 120d, then past any electronic components that might be located within the lower chamber 130c, through the blower (not shown), and out of the sixth exhaust port 122f.

The disclosed blowers 140a-c are each configured to generate an airflow through their respective chambers between about 5 cubic feet per minute (CFM) and about 20 cubic feet per minute (CFM). More specifically, the disclosed blowers 140a-c can each be configured to generate an airflow through their respective chambers between about 13 cubic feet per minute (CFM) and about 14 cubic feet per minute (CFM).

The disclosed blowers 140a-c are each configured to create a negative pressure in their respective chambers between about 25 Pascals (0.1 inches of water (inAq)) and about 250 Pascals (1.0 inches of water (inAq)). Alternatively, the disclosed blowers 140a-c are each configured to create a negative pressure in their respective chambers between about 50 Pascals (0.2 inches of water (inAq)) and about 225 Pascals (0.9 inches of water (inAq)). More specifically, the disclosed blowers 140a-c can each be configured to create a negative pressure in their respective chambers between about 150 Pascals (0.6 inches of water (inAq)) and about 212 Pascals (0.85 inches of water (inAq)).

The first and/or second surfaces 135a,b (shown in FIGS. 4A and 5) each includes one or more apertures (not shown) such that air can flow and/or move between the adjacent chambers 130a-c. These apertures are generally provided to allow electrical wires to be run between the chambers 130a-c to connect electronic components within the gaming terminal 100. In some implementations of the present disclosure, the one or more apertures (not shown) in either of the first or second surfaces 135a,b can have a total square footage between about 5 square inches and about 15 square inches. More specifically, the one or more apertures (not shown) in either of the first or second surfaces 135a,b can have a total square footage between about 6 square inches and about 10 square inches. The one or more apertures (not shown) in either of the first or second surfaces 135a,b can have a total square footage of no more than 8 square inches. The amount and size of the apertures is designed such that, notwithstanding the apertures, the surfaces 135a,b still act as a thermal barrier between the adjacent chambers 130a-c.

The blowers 140a-c described herein each have an air inlet and an air exit. Air is drawn into the blowers 140a-c through the air intake and air is forced out of the blowers 140a-c through the air exit. The air inlet of a blower is generally contained within a plane that is perpendicular to a plane containing the air exit of the blower. That is, air enters a blower in a first direction and exits the blower in a second direction that is orthogonal to the first direction, which is different than an axial fan that expels air in the same direction that it enters the axial fan. This relationship of the air inlet and air exit in the blowers of the present disclosure allows for desirable placement of the blowers within the gaming cabinet 112 as shown in the FIGS. and described herein.

The chambers 130a-c (shown in FIG. 4A) are referred to herein as the upper chamber 130a, the middle chamber 130b, and the lower chamber 130c; however, the gaming terminals of the present disclosure can include more or less chambers. For example, a gaming terminal of the preset disclosure can include two chambers, four chambers, five chambers, etc. In some of such alternatives, the adjectives upper and middle and lower used in the present disclosure can be interchanged such that the middle chamber 130b can be referred to as lower chamber (i.e., when no third lower chamber 130c is included).

While the video display assembly 200 is described herein as being in the upper chamber 130a, the video display assembly 200 can alternatively be positioned adjacent to the upper chamber 130a. In such alternatives, the video display assembly 200 can be directly or indirectly coupled to an upper most surface of the upper chamber 130a. The video display assembly 200 can also be coupled to the upper chamber 130a such that a portion of the video display assembly 200 protrudes into the upper chamber 130a (e.g., the display housing 210).

The present disclosure and FIGS. discuss and illustrate certain numbers of intake ports 120, exhaust ports 122, and blowers 140; however, the number of intake ports, exhaust ports, and blowers can vary depending on the number and type of electronic components within the gaming cabinet 112 and the dimensions of the gaming cabinet. For example, if more electronic components are used, then the number of blowers and exhaust ports might be increased to provide for additional thermal management.

While the upper chamber 130a is described and shown to be defined by the first surface 135a, the upper chamber 130a can be defined by the channel 220. That is, the upper chamber 130a can be between the back side 114b of the video display 114a and the base 210a of the display housing 210. In such embodiments, the upper chamber 130a can be equivalent to the channel 220 and the middle chamber 130b can be defined as being between an underside of the base 210a and a top of the second surface 135b. Alternatively, the upper chamber 130a can be defined by the channel 220 (i.e., between 114b and 210a), the area between the underside of the base 210a and a top of the first surface 135a can be an intermediate chamber, and the area between an underside of the first surface 135a and the top of the second surface 135b can be the middle or lower chamber. In such alternatives, the intermediate chamber can provide additional insulation and/or be an additional thermal barrier between the upper and lower chambers.

As described above, the video display 114a is cooled and the heat generated by the video display 114a is exhausted by creating a negative pressure in the channel 220 to pull ambient air across the back side 114b of the video display 114a. In addition to cooling the video display 114a to prolong its operational life and reduce down time for maintenance and costs associated therewith, this cooling method reduces an amount of dust that typically accumulates inside of video display housings using conventional cooling methods. For example, some prior video displays were cooled by blowing air into the outer housing of the video display and allowing the air to escape from one or more cracks or exhaust ports. This technique results in significant amounts of dust accumulating on the internal components that can negatively affect the performance and life of the video display. By pulling ambient air across the back side 144b of the video display 114a, dust in the ambient air has little or no internal video display components to stick onto during the cooling.

Each of these embodiments and obvious variations thereof is contemplated as falling within the spirit and scope of the claimed invention, which is set forth in the following claims.

What is claimed is:

1. A gaming terminal for playing a wagering game, comprising:
   a gaming cabinet including a first intake port and a first exhaust port;
   a first surface within the cabinet dividing the cabinet into a first chamber and a second chamber, each of the chambers enclosing at least one respective electronic component used in conjunction with the wagering game; and
   a first blower disposed in the first chamber and adjacent to the first exhaust port in the cabinet, the first chamber being at least partially sealed,
   wherein by operation of the first blower, ambient air is drawn into the first chamber via the first intake port and directed towards the first exhaust port such that an air pressure at the first exhaust port is lower than an air pressure at the first intake port, thereby creating a negative pressure within the first chamber.

2. The gaming terminal of claim 1, wherein the first blower has an air inlet generally contained within a first plane and an air exit generally contained in a second plane, the first plane being substantially perpendicular to the second plane.

3. The gaming terminal of claim 1, wherein air enters the first blower in a first direction and exits the first blower in a second direction that is orthogonal to the first direction.

4. The gaming terminal of claim 1, further comprising a second blower disposed in the second chamber and adjacent to a second exhaust port in the cabinet, the second chamber being at least partially sealed, wherein by operation of the second blower, the ambient air is drawn into the second chamber via a second intake port in the cabinet and directed towards the second exhaust port such that an air pressure at the second exhaust port is lower than an air pressure at the second intake port, thereby creating a negative pressure within the second chamber.

5. The gaming terminal of claim 4, wherein the first intake port and the first exhaust port are located in the first chamber and wherein the second intake port and the second exhaust port are located in the second chamber.

6. The gaming terminal of claim 4, further comprising a second surface within the cabinet further dividing the cabinet into a third chamber enclosing a second electronic component used in conjunction with the wagering game.

7. The gaming terminal of claim 6, further comprising a third blower disposed in the third chamber and adjacent to a third exhaust port in the cabinet, the third chamber being at least partially sealed, wherein by operation of the third blower, the ambient air is drawn into the third chamber via a third intake port and directed towards the third exhaust port to create a lower air pressure at the third exhaust port relative to an air pressure at the third intake port, thereby creating a negative pressure within the third chamber.

8. The gaming terminal of claim 7, wherein each of the intake ports is accessible to ambient air from a front of the gaming terminal and each of the exhaust ports exhausts the ambient air entering the corresponding intake port out of a back of the gaming terminal.

9. The gaming terminal of claim 1, wherein the gaming cabinet generally includes a front wall, an opposing back wall, two opposing side walls, a base, and a lid, the front wall including the intake port and the back wall including the first exhaust port.

10. The gaming terminal of claim 4, wherein the first and second exhaust ports are offset from a vertical centerline of the gaming cabinet such that air exiting the first and the second exhaust ports is not directly exhausted towards corresponding first and second exhaust ports in a second gaming terminal positioned in a back-to-back relationship with the gaming terminal.

11. The gaming terminal of claim 1, wherein the first surface is generally horizontal and includes one or more apertures having a total square footage of no more than 8 square inches, notwithstanding the apertures, the first blower being operated to create the negative pressure within the first chamber.

12. The gaming terminal of claim 1, wherein the first blower is configured to generate an airflow through the first chamber between about 5 cubic feet per minute (CFM) and about 15 cubic feet per minute (CFM).

13. The gaming terminal of claim 1, wherein the first blower is configured to generate an airflow through the first chamber of about 13 cubic feet per minute (CFM).

14. The gaming terminal of claim 1, wherein the first blower creates a negative pressure in the at least partially sealed first chamber between about 25 Pascals (0.1 inches of water (inAq)) and about 250 Pascals (1.0 inches of water (inAq)).

15. The gaming terminal of claim 1, wherein the first blower creates a negative pressure in the at least partially sealed first chamber between about 50 Pascals (0.2 inches of water (inAq)) and about 225 Pascals (0.9 inches of water (inAq)).

16. The gaming terminal of claim 1, wherein the first blower creates a negative pressure in the at least partially sealed first chamber between about 150 Pascals (0.6 inches of water (inAq)) and about 212 Pascals (0.85 inches of water (inAq)).

17. A gaming terminal for playing a wagering game, comprising:
  a gaming cabinet including an intake port and an exhaust port;
  a first surface within the cabinet dividing the cabinet into an upper chamber and a lower chamber, the lower chamber enclosing at least one electronic component used in conjunction with the wagering game;
  a video display coupled to the upper chamber of the gaming cabinet, the video display being disposed at an angle such that a display area of the video display is positioned between about 0 degrees and about 45 degrees relative to horizontal; and
  a first blower disposed in the upper chamber and adjacent to the exhaust port in the cabinet, the upper chamber being at least partially sealed such that within the upper chamber the first blower creates a negative pressure in which an air pressure at the exhaust port is lower than an air pressure at the intake port.

18. The gaming terminal of claim 17, wherein the negative pressure causes ambient air to enter the intake port and flow through the upper chamber adjacent to a back side of the video display opposite the display area.

19. The gaming terminal of claim 18, wherein the ambient air increases in temperature while flowing through the upper chamber and the first blower is configured to direct the increased temperature air towards the exhaust port in the cabinet.

20. The gaming terminal of claim 17, wherein the display area of the video display is positioned between about 15 degrees and about 30 degrees relative to horizontal.

21. The gaming terminal of claim 17, wherein the intake port is positioned to draw ambient air into a front of the gaming cabinet, and the exhaust port is positioned to exhaust air away from a rear of the gaming cabinet.

22. The gaming terminal of claim 17, wherein the negative pressure created by the blower is negative relative to the ambient pressure outside of the cabinet.

23. A gaming terminal for playing a wagering game, comprising:
  a gaming cabinet including an intake port and an exhaust port;
  a first surface within the cabinet dividing the cabinet into an upper chamber and a lower chamber, the lower chamber enclosing at least one electronic component used in conjunction with the wagering game;
  a video display assembly including a video display having a display area and a display housing, the video display assembly being positioned adjacent to the upper chamber of the gaming cabinet at an angle between about 0 degrees and about 45 degrees relative to horizontal, the display housing forming a longitudinal channel along a substantial portion of a back side opposite the display area and between a dedicated display intake port adjacent to the intake port of the cabinet and a dedicated display exhaust port adjacent to the exhaust port of the cabinet; and
  a first blower disposed in the upper chamber and adjacent to the dedicated display exhaust port and the first exhaust port in the cabinet, the longitudinal channel being at least partially sealed such that the first blower creates a negative pressure within the longitudinal channel.

24. The gaming terminal of claim 23, wherein the negative pressure causes ambient air to enter the dedicated display intake port from the intake port of the cabinet and flow through the longitudinal channel adjacent to the back side opposite the display area.

25. The gaming terminal of claim 23, wherein the display area of the video display is positioned between about 15 degrees and about 30 degrees relative to horizontal.

26. The gaming terminal of claim 23, further comprising an input device configured to receive wagers from a plurality of players to play the wagering game.

27. The gaming terminal of claim 23, further comprising a secondary video display generally vertically oriented within the cabinet.

28. The gaming terminal of claim 27, wherein a display area of the secondary video display is positioned at an angle between about 75 degrees and about 125 degrees relative to the horizontal.

29. The gaming terminal of claim 23, wherein the upper chamber is coupled to the lower chamber of the gaming cabinet via a hinge such that the upper chamber can be rotated to provide access to the lower chamber.

30. The gaming terminal of claim 23, wherein heat energy conducted by the back side of the video display into the longitudinal channel is exhausted out of the dedicated display exhaust port away from the cabinet.

31. A video display assembly for displaying at least a portion of a wagering game, comprising:
  a video display configured to display a randomly selected outcome of the wagering game, the video display being disposed at an angle such that a display area of the video display viewable by a player of the wagering game is positioned between about 0 degrees and about 45 degrees relative to horizontal;
  a display housing coupled to the video display, the display housing forming an air conduit along a substantial portion of a back side of the video display opposite the display area, the air conduit lying between a dedicated intake port and a first dedicated exhaust port of the display housing; and
  a first blower coupled to the display housing adjacent to the first dedicated exhaust port, the air conduit being at least partially sealed such that the first blower creates a negative pressure within the air conduit.

32. The video display assembly of claim 31, further comprising a second blower coupled to the display housing adjacent to a second dedicated exhaust port in the display housing.

33. The video display assembly of claim 31, wherein the negative pressure causes ambient air to enter the dedicated intake port and flow through the air conduit adjacent to the back side of the video display opposite the display area.

34. The video display assembly of claim 31, wherein the display area of the video display is positioned between about 15 degrees and about 30 degrees relative to horizontal.

35. The video display assembly of claim 31, wherein the video display assembly is configured to be hingedly coupled to a gaming cabinet of a gaming terminal.

36. A gaming terminal for playing a wagering game, comprising:
    a gaming cabinet including first and second intake ports and first and second exhaust ports;
    a first surface within the cabinet dividing the cabinet into an upper chamber and a lower chamber, each of the chambers enclosing at least one respective heat-generating electronic component each used in conjunction with the wagering game;
    a first blower disposed in the upper chamber and adjacent to the first exhaust port in the cabinet, the upper chamber being at least partially sealed such that the first blower is configured to draw ambient air into the upper chamber from the first intake port and direct the air towards the first exhaust port; and
    a second blower disposed in the lower chamber and adjacent to the second exhaust port in the cabinet, the lower chamber being at least partially sealed such that the second blower is configured to draw ambient air into the lower chamber from the second intake port and direct the air towards the second exhaust port,
    wherein in response to the second blower being inactive, the temperature of the air flowing through the upper chamber increases no more than ten degrees Celsius.

37. The gaming terminal of claim 36, wherein in response to the second blower being inactive, the temperature of the air flowing through the upper chamber increases no more than five degrees Celsius.

38. The gaming terminal of claim 36, wherein in response to the second blower being inactive, the temperature of the air flowing through the upper chamber increases no more than one degree Celsius.

39. The gaming terminal of claim 36, wherein in response to the first blower being inactive, the temperature of the air flowing through the lower chamber increases no more than one degree Celsius.

40. A gaming terminal for playing a wagering game, comprising:
    a gaming cabinet including a first intake port and a first exhaust port;
    a first surface within the cabinet dividing the cabinet into an upper chamber and a lower chamber, the lower chamber enclosing at least one electronic component used in conjunction with the wagering game;
    a video display assembly including a video display having a display area and a display housing, the video display assembly being positioned within the gaming cabinet at an angle between about 0 degrees and about 45 degrees relative to horizontal, the display housing forming a longitudinal channel along a substantial portion of a back side of the video display opposite the display area and between a dedicated display intake port and a dedicated display exhaust port; and
    a first blower coupled about the dedicated display exhaust port, the longitudinal channel being at least partially sealed such that the first blower is configured to draw ambient air through the dedicated display intake port into the channel from the first intake port and direct the air towards the first exhaust port.

41. The gaming terminal of claim 40, wherein a base of the display housing is the first surface within the cabinet that divides the cabinet into the upper and lower chambers and wherein the channel is the upper chamber.

42. The gaming terminal of claim 40, wherein the back side of the video display is a heat sink configured to transfer at least a portion of heat generated within the video display into the channel.

43. The gaming terminal of claim 40, further comprising a second blower positioned within the lower chamber and adjacent to a second exhaust port included in the gaming cabinet, the lower chamber being at least partially sealed such that the second blower is configured to draw ambient air into the lower chamber from a second intake port included in the cabinet and direct the air towards the second exhaust port.

44. The gaming terminal of claim 43, wherein in response to the second blower being inactive, the temperature of the air flowing through the channel increases no more than three degrees Celsius.

45. The gaming terminal of claim 43, wherein in response to the second blower being inactive, the temperature of the air flowing through the channel increases no more than one degree Celsius.

* * * * *